United States Patent
Takahashi et al.

(10) Patent No.: US 8,350,791 B2
(45) Date of Patent: Jan. 8, 2013

(54) IMAGE DISPLAY CONTROLLING DEVICE

(75) Inventors: Masaru Takahashi, Tokyo (JP); Soichi Kobayashi, Tokyo (JP); Toshiyuki Maruyama, Tokyo (JP)

(73) Assignee: Renesas Electronics Corporation, Kanagawa (JP)

( * ) Notice: Subject to any disclaimer, the term of this patent is extended or adjusted under 35 U.S.C. 154(b) by 718 days.

(21) Appl. No.: 12/003,555

(22) Filed: Dec. 28, 2007

(65) Prior Publication Data

US 2008/0165268 A1 Jul. 10, 2008

(30) Foreign Application Priority Data

Jan. 4, 2007 (JP) ................................ 2007-000172

(51) Int. Cl.
*G09G 3/36* (2006.01)
(52) U.S. Cl. ......................................................... 345/87
(58) Field of Classification Search .................... 345/87, 345/99–100
See application file for complete search history.

(56) References Cited

U.S. PATENT DOCUMENTS

| | | | | |
|---|---|---|---|---|
| 5,635,984 | A * | 6/1997 | Lee | 348/333.05 |
| 6,271,866 | B1 * | 8/2001 | Hancock et al. | 345/544 |
| 2004/0095508 | A1 * | 5/2004 | Chida | 348/458 |
| 2006/0164364 | A1 * | 7/2006 | Murase et al. | 345/98 |

FOREIGN PATENT DOCUMENTS

| | | |
|---|---|---|
| JP | 2000-23108 | 1/2000 |
| JP | 2001-125548 | 5/2001 |
| JP | 2006-267381 | 10/2006 |

* cited by examiner

*Primary Examiner* — Yong H Sim
(74) *Attorney, Agent, or Firm* — McDermott Will & Emery LLP

(57) ABSTRACT

In displaying image data received from a camera module on a display device such as a view finder, image data having a size suited for display from an image size conversion circuit is displayed via line memories included in a signal-for-display generation circuit. Vertical synchronization in an image data storage including these line memories is established by initializing a reading address in accordance with a frame head pixel indication and a reading completion indication of one line in the line memories. It is possible to reduce power consumption of an image display system for displaying an image of a imaging subject.

3 Claims, 11 Drawing Sheets

HRB, VRB : VALID REGION
HRA, HRC, VRA, VRC : INVALID REGION

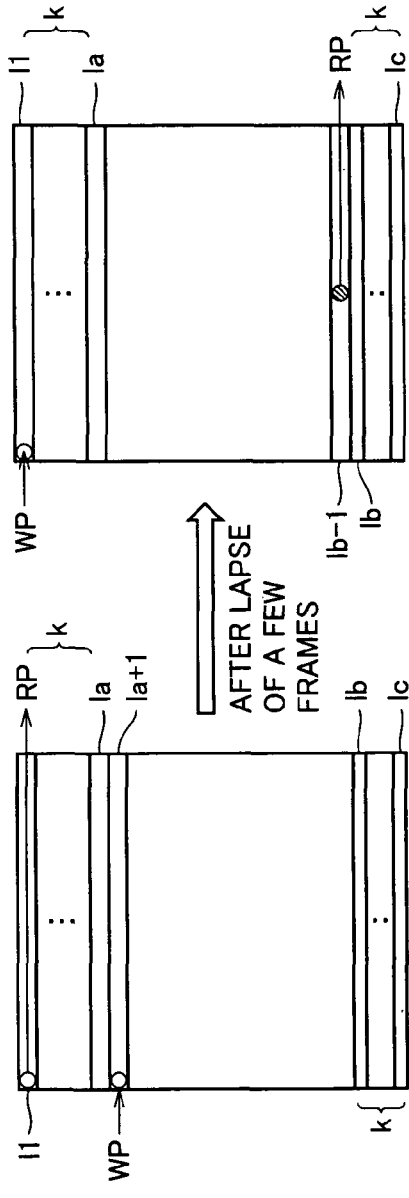
FIG.5A
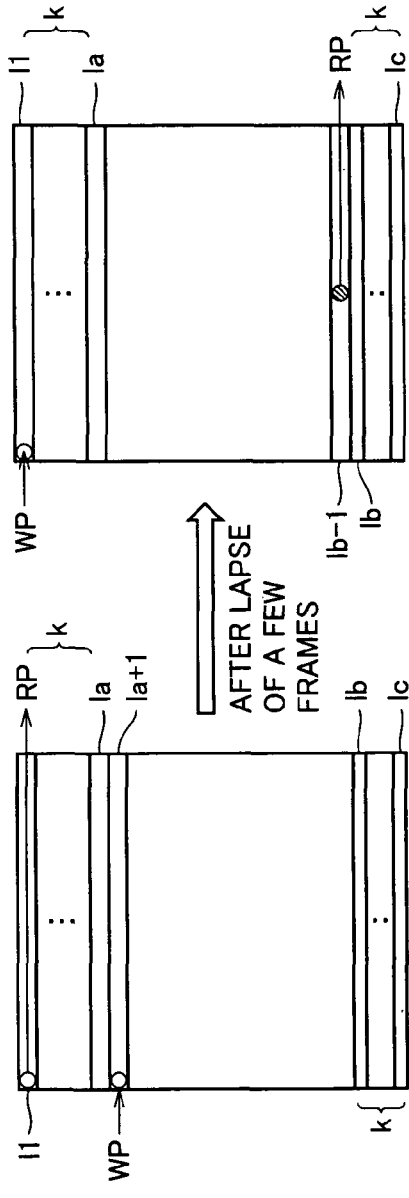
FIG.5B
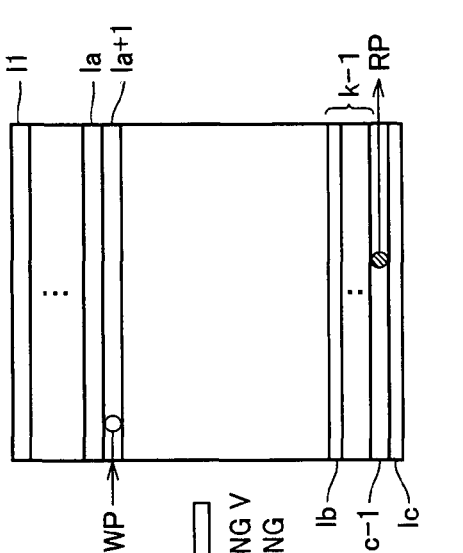
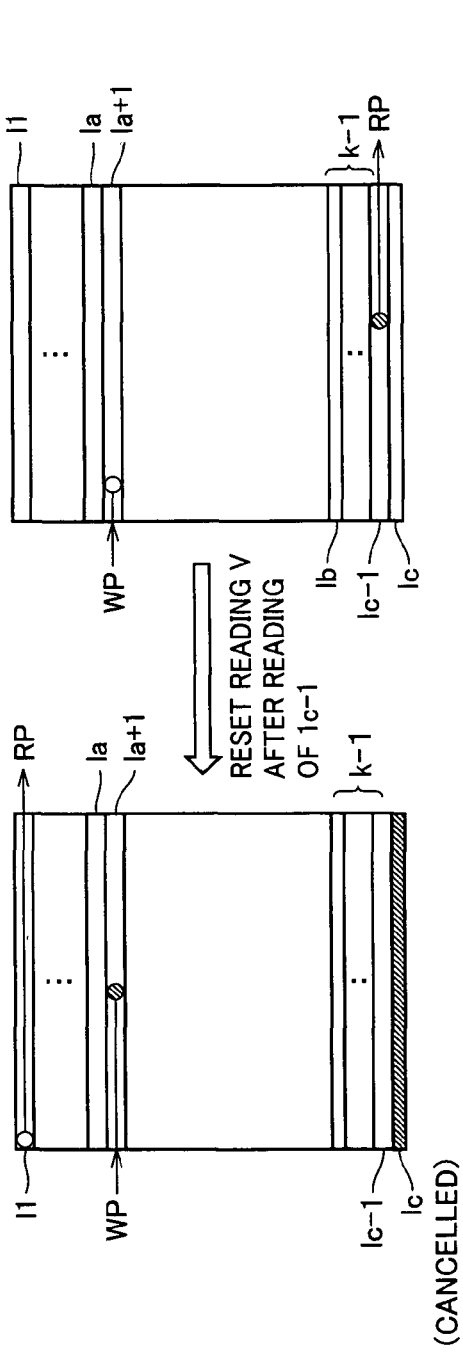
FIG.5C
FIG.5D

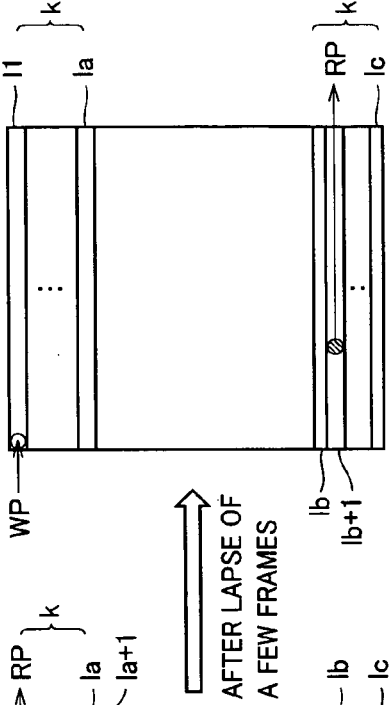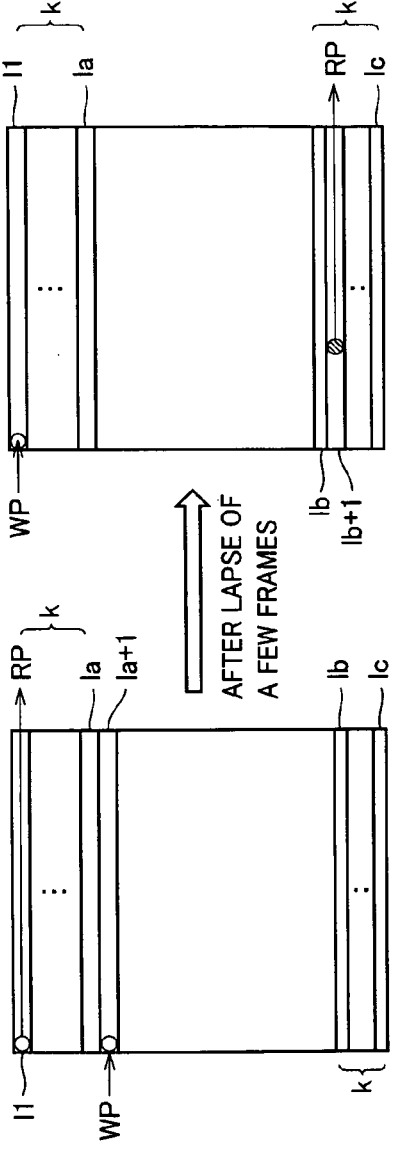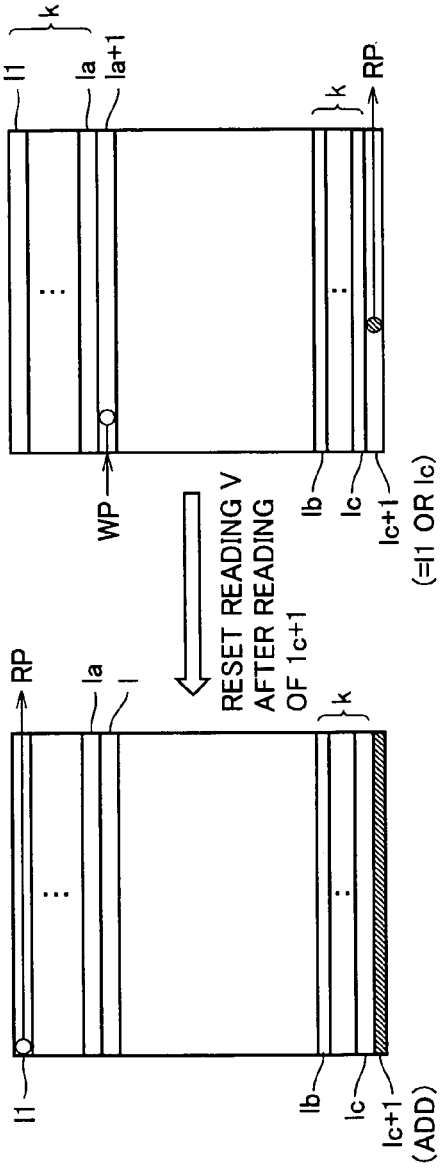

IMAGE DISPLAY CONTROLLING DEVICE

BACKGROUND OF THE INVENTION

1. Field of the Invention

The present invention relates to image display controlling devices, and in particular, to an image display controlling device for displaying an image on a display unit for monitoring an imaging condition of a photographic subject in a camera module. The camera module is a digital still camera or a digital video camera, and the display unit is a view finder or an LCD (liquid crystal display) monitor.

2. Description of the Background Art

In a camera using a solid-state imaging device such as a digital still camera and digital video camera, a view finder using a liquid crystal display (LCD) or an LCD monitor is used for visually checking a subject to be imaged or picked up. In displaying an image on a view finder of a digital still camera, image data is processed in the following manner as disclosed in Japanese Patent Laying-Open No. 2006-267381 (Patent Document 1). Specifically, analogue image information of a subject is first generated using a solid-state image sensing device such as a CCD (charge-coupled device) or CMOS sensor. The analogue image information is converted into digital image data by an analogue front end, and then the converted image data is stored in a buffer memory under the control of an image processing controller.

Then, the image processing controller reads out image data from the buffer memory, and stores again the imaged data in the buffer memory after performing processing such as white balance correction. Subsequently, the image data is read out again frame-by-frame from the buffer memory under control of the image processing controller, and converted into a video signal. The video signal is transferred to a view finder of an LCD display device and displayed thereon after resized into a predetermined size for display on the view finder.

Such a buffer memory is used as memory for a temporal storage of data such as image data, and is used as a work area in executing various processing on the image data.

Also in a digital still camera, an LCD monitor is generally used for checking an image after imaging or picking up. According to the configuration as disclosed in Patent Document 1, in display on the LCD monitor, an image processing controller again reads out image data stored in the buffer memory and stores the read out image data in the buffer memory after executing predetermined imaging processing such as white balance correction, tone correction, color correction and the like. The image data stored in the buffer memory is again read out and converted into a video signal, and outputted to an LCD monitor for display after being resized into a predetermined size suitable for display on the LCD monitor.

Although not being the case of a camera module, Japanese Patent Laying-Open No. 2000-023108 (Patent Document 2) and Japanese Patent Laying-Open No. 2001-125548 (Patent document 3) disclose the use of a scan converter as an interface for matching the synchronization frequencies of an input image display format and an output image display format when these formats are different from each other.

In the configuration shown in Japanese Patent Document 2, line memories for storing several lines of pixel data are used as a buffer memory for storing image data. In this case, controls of input and output are not performed on a frame basis. In the case of such writing/reading, different clock signals are used for a writing clock signal and a reading clock signal. When a phase lag between a horizontal synchronization signal and the writing clock signal on an input side differs from a phase lag between a horizontal synchronization signal and a reading clock signal on an output side, jitter occurs in a displayed image on the output side. In Patent Document 2, for preventing such jitter, writing of a line memory is performed as follows. On the input side, pixel data is written into the line memory after amplitude correction depending on a time difference (phase difference) between the horizontal synchronization signal and the writing clock signal. In this amplitude correction, a differential value in amplitude between adjacent input pixels is divided by a cycle time of the writing clock signal. Thereafter, it is multiplied by time difference between the writing clock signal and the writing horizontal synchronization signal, to generate writing pixel data.

In the configuration shown in Patent Document 3, similarly, a line memory is used for a buffer memory for pixel data storage. In Patent Document 3, when the line memory is used for a buffer memory, different clock signals are used doe a writing clock signal and for a reading clock signal. In order to adjust the difference in timing between the writing and reading clock signals, timing is adjusted in writing and reading of pixel data. Specifically, the periods of the input-side and output-side horizontal synchronization signals are adjusted in units of one operation clock signal period in accordance with difference in resolution between the input side and the output side. In the adjustment of the cycle periods of the horizontal synchronization signals, the number of horizontal synchronization signals in one vertical scanning period is adjusted. When writing into and reading from the line memories are started concurrently from the same initial position, overflow/ underflow may occur in the line memories due to difference between writing rate and reading rate. In Patent Document 3, reading start position of the line memories is calculated and set initially in order to prevent such underflow or overflow.

In the configuration of a digital camera shown in Patent Document 1, a memory that stores several frames of image data is used as a buffer memory. Therefore, the buffer memory is large in storage capacity, and is difficult to integrate on one chip together with an image processing controller for a one-chip system LSI. This is an obstacle to down-sizing/up-integration. When a frame memory is connected outside the image processing controller, it is necessary to make circuits, such as external bus controller and a DMA (direct memory access) controller for conducting input/output of image data, operate. The DMA controller is provided for directly performing writing/reading of image data not through a CPU serving as a main controller. For this reason, the problem of increased power dissipation arises. When the frame memory is provided externally, operation clock frequency of circuit such as external bus controller and DMA controller can be reduced only to such a clock rate at which data can be written into and read from the frame memory without any delay. This disadvantageously makes it difficult to reduce the power consumption during use of the view finder.

In Patent Document 2, amplitude of input pixel data is corrected, in accordance with time difference between the input horizontal synchronization signal and the writing clock signal, in writing image data into the line memories. This correction of amplitude is based on the assumption that amplitude of pixel data changes linearly between adjacent pixels. When the image changes gently, the correction of amplitude may be made according to this linearly proportional distribution. However, in the area where the image rapidly changes such as at the contour, there is a possibility that the corrected pixel data may not correspond to the input pixel data. This leads the problem of difficulty of accurately reproducing an image.

Also, in Patent Document 2, writing and reading of pixel data to/from the line memories are performed in synchronization with separate operation clock signals. Phase/frequency lag between these operation clock signals may cause overflow/underflow in the line memories. However, Patent Document 2 does not consider such situation.

Patent Document 3 considers the problem of synchronization of writing and reading of image data in scan conversion using the line memories. However, in Patent Document 3, in an initialization sequence, horizontal scanning period on the output side is adjusted in accordance with difference in resolution between input side and output side, to adjust the number of horizontal scanning lines displayed on the screen in a valid display region is set to the value suited to the display resolution. It is determined whether a product of the adjusted display pixel number and a period of the clock signal on the input side is equal to a product of the display pixel number and the period of the output clock signal on the output side. In an operation of adjusting the period of the horizontal synchronization signal, horizontal scanning period is increased or decreased by one cycle period of operation clock signal according to each determination result. Finally, whether the number of horizontal scanning lines in the valid image region has reached an intended value is determined. The adjustment of horizontal scanning period is executed repeatedly until the intended number of horizontal scanning lines is displayable. Therefore, complicated calculation should be made so as to establish the horizontal synchronization, and a long time is required for making such determination. Further, the cycle period of the output horizontal synchronization signal is adjusted in units of operation clock signals, so that this initialization sequence is time-consuming. As a result, in a digital still camera, time is consumed until an image to be imaged is accurately displayed in the view finder and the perfect shot may possibly be missed when the procedure of establishing synchronization as shown in Patent Document 3 is employed.

In Patent Document 3, once reading timing of pixel data on the output side is established in the initialization sequence, subsequent reading of pixel data from the line memories is fixedly executed at this established timing. Therefore, when the frequency of the operation clock signal varies, for example, due to variation in power supply voltage during operation state, accurate reading and reproduction of image data may not be allowed.

Therefore, the configurations of the scan converters shown in Patent Documents 2 and 3 are difficult to be directly applied to the configuration of displaying on a view finder or LCD monitor of e.g., a digital still camera or a digital video camera.

SUMMARY OF THE INVENTION

It is an object of the present invention to provide an image display controlling device capable of displaying an image of a photographic subject to be imaged in real time at low power consumption by converting display method of the image correctly by simple control.

In brief, an image display controlling device according to the present invention utilizes line memories embedded in the image display controlling device, for displaying an image on a display device provided for monitoring an image to be captured. For reading image data from the line memories, a read address is initialized in accordance with a state in the line memories of storage of image data received from a camera module, and a state of reading image data to the display device. Specifically, the read address of the line memories is initialized in accordance with an instruction of storing head pixel data of one frame and reading of the last pixel of one line of image data.

In one embodiment, the image display controlling device according to the present invention includes a plurality of line memories each storing pixel data of one line on a screen; a data writing unit for storing image data of the plurality of line memories; and a data reading unit for sequentially reading stored pixel data from the plurality of line memories and transferring the read out pixel data to a display unit. The data reading unit initializes a reading position to a head position of an image storage of the plurality of line memories in accordance with a screen head position pixel writing instruction from the data writing unit, and completion of reading of a predetermined number of line memories from the time point when the head position pixel writing instruction is applied.

In the present invention, a line memory is used. Therefore, it is possible to reduce the space and cost compared to the configuration using a frame memory. Further, by incorporating the line memory in a display controlling device, it is not necessary to drive a frame memory via an external bus and it is possible to reduce power consumption.

Further, in accordance with storage state of data in the line memories and reading state of image data from the line memories, reading from the line memories is adjusted. Therefore, it is possible to store and read pixel data with respect to the line memories easily and accurately without performing complicated controlling operation.

Furthermore, reading of pixel data from the line memories is adjusted in accordance with storage state and reading state of image data of the line memories. Therefore, even when operation clock signals for writing and for reading vary, pixel data can be read out while adjusting reading timing of pixel data. Therefore, it is possible to accurately read out and display image data while flexibly reflecting variation in clock signal.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5A to FIG. 5D are diagrams representing operation of establishing synchronization.

FIG. 7A to FIG. 7D are diagrams schematically representing reset operation in reading sequence when vertical synchronization is established in the first embodiment of the present invention.

DESCRIPTION OF THE PREFERRED EMBODIMENTS

First Embodiment

Figure 1:
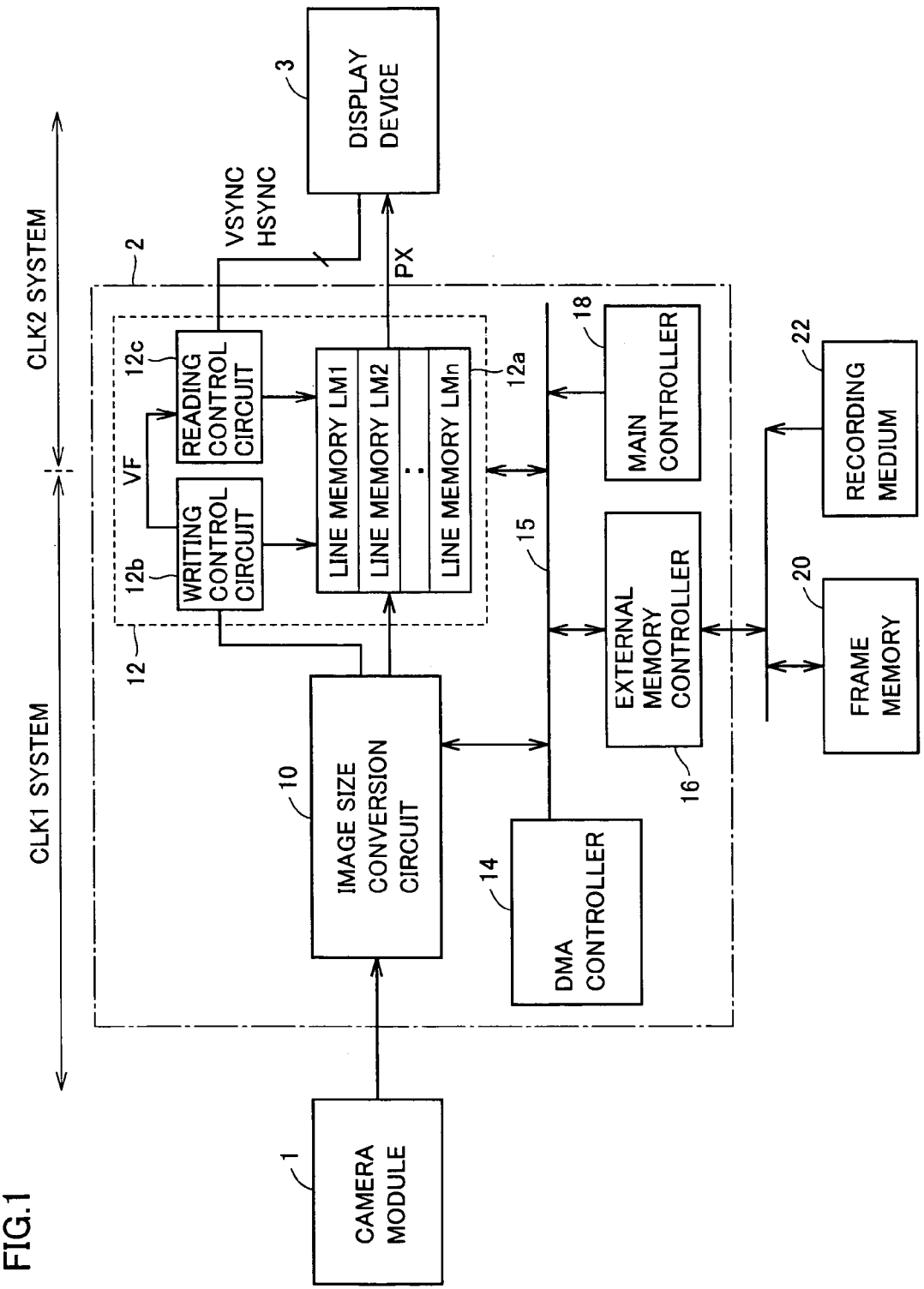
FIG. 1 is a diagram schematically showing a configuration of an image display system including an image display unit according to the first embodiment of the present invention.

FIG. 1 is a diagram schematically showing a configuration of an image display controlling device according to a first embodiment of the present invention. In FIG. 1, an image display controlling device 2 performs an image processing, such as resizing (size adjustment) and a white balance correction, on image data received from a camera module 1 and outputs the processed image data to a display device 3. Image display controlling device 2 is implemented, for example, by a system LSI, and formed being integrated on one semiconductor chip.

In the first embodiment, camera module 1 is a camera module that generates digital image and includes a solid-state image sensing device such as a CCD or CMOS sensor.

Display device 3 includes a LCD display unit, and is, for example, an electronic view finder (EVF) in a digital still camera. When this camera module 1 is a digital video camera, and takes a moving image, display device 3 is an LCD monitor that displays the moving picture under imaging. Display device 3 may be an LCD monitor in a digital still camera, or may be an electronic view finder in a digital video camera.

Image processing controlling device 2 includes an image size conversion circuit 10 for converting a size of a taken image received from camera module 1 into a size suited for display on display device 3, and a signal-for-display generation circuit 12 for sequentially transferring image data from image size conversion circuit 10 to display device 3.

When display device 3 is an electronic view finder (EVF; hereinafter, simply referred to as "view finder"), image size conversion circuit 10 receives taken image data from camera module 1, and converts the size of the taken image from camera module 1 into the image size that is displayable in display device 3, and performs image processing such as white balance correction suited for display in display device 3. Also in the case where camera module 1 is a digital video camera or a digital still camera, and display device 3 is an LCD monitor for displaying a taken image, image size conversion circuit 10 receives image data from camera module 1 and performs necessary image processing and image size conversion.

Signal-for-display generation circuit 12 includes an image storage 12a for storing image data from image size conversion circuit 10, a writing control circuit 12b and a reading control circuit 12c for respectively controlling writing and reading of image data to/from storage 12a.

Image data storage 12a includes line memories LM1 to LMn for storing pixel data of a plurality of lines on screen (frame). Line memories LM1 to LMn each have storage capacity sufficient for storing one line of image data of a displayed image. Each of line memories LM1 to LMn performs writing and reading of applied pixel data in FIFO (first-in, first-out) manner.

In the following explanation, the term "pixel data" is used for referring to data of an individual pixel, and the term "image data" is used for referring to data of a series of pixels.

Writing control circuit 12b controls storage operation of pixel data in line memories LM1 to LMn of image data storage 12a according to vertical and horizontal synchronization signals from image size conversion circuit 10. Reading control circuit 12c sequentially outputs pixel data PX stored in image data storage 12a to display device 3, and outputs a horizontal synchronization signal HSYNC representing line switching and a vertical synchronization signal VSYNC representing frame switching to display device 3.

Reading control circuit 12c initializes a head reading position (read starting position) when a frame head pixel writing instruction VF is applied from writing control circuit 12b and a predetermined condition is satisfied. Frame head pixel writing instruction VF is, for example, a signal generated in synchronization with vertical synchronization signal. The predetermined condition is a condition of completion of reading of pixel data of a line after a certain horizontal period of time. The certain horizontal period of time represents the time period by which reading is delayed with respect to writing to image data storage 12a.

As a result, even in the case where writing control circuit 12b and reading control circuit 12c operate in synchronization with operation clock signals which are generated based on separate clocks CLK1 and CLK2, writing and reading of image data to/from image data storage 12a can be performed while the difference in timing is adjusted on one line period basis.

Image processing controlling device 2 further includes an external memory controller 16 for controlling access to an external memory, a main controller 18 for controlling various processing such as image processing and EVF display in image processing controlling device 2, and a DMA controller 14 for directly executing data transfer with an external memory through external memory controller 16 not through main controller 18. Internal components of image processing controlling device 2 are connected to the external via an internal bus 15.

To external memory controller 16, a frame memory 20 and a recording medium 22 are coupled via an external interface. Frame memory 20 is used as a work area in execution of image processing in image processing controlling device 2, and is used as an area for storing a modifiable or updatable application program.

Recording medium 22 is an external memory such as SD (Secure Digital) memory, for example, and stores a large amount of image data. Recording medium 22 may be a hard disc for storing a large amount of motion picture data when camera module 1 is a digital video camera module.

For confirming a taken image after picking up, image data from recording medium 22 is read out to an LCD monitor being display device 3, and image processing such as size adjustment and tone adjustment are executed so as to generate an image corresponding the actual taken image, and the resultant image is displayed on an LCD monitor of display device 3. As a result, the taken image can be verified regardless of a still image or a motion image.

In the image display system shown in FIG. 1, camera module 1, image size conversion circuit 10 and writing control circuit 12b operate in synchronization with an operation clock signal generated in accordance with clock signal CLK1. Reading control circuit 12c and display device 3 operate in accordance with an operation clock signal generated according to clock signal CLK2. These clock signals CLK1 and CLK2 are generated by individual clock generation circuits such as PLL circuit (not shown), and are clock signals which are asynchronous with each other.

Operation frequency of camera module 1 is 40 to 50 MHz, for example, and operation frequency of display device 3 is a few MHz to 13.5 MHz. In other words, since camera module 1 and display device 3 are formed by separate and individual chips, operation clock frequency which is set as a recommended value differs from each other. These operation clock signals are separated ones from each other, and generated asynchronously. Therefore, timing difference arises between these clock signals CLK1 and CLK2. This difference in timing is absorbed by using image data storage 12a.

When writing speed and reading speed in image data storage 12a differ from each other, overflow or under flow occurs in image data storage 12a. Therefore, depending on difference in operation clock number at the time of display to display device 3, line memories LM1 to LMn are provided for storing pixel data of, for example, 10 lines. After storing pixel data of a few lines, pixel data is read out.

Figure 2:
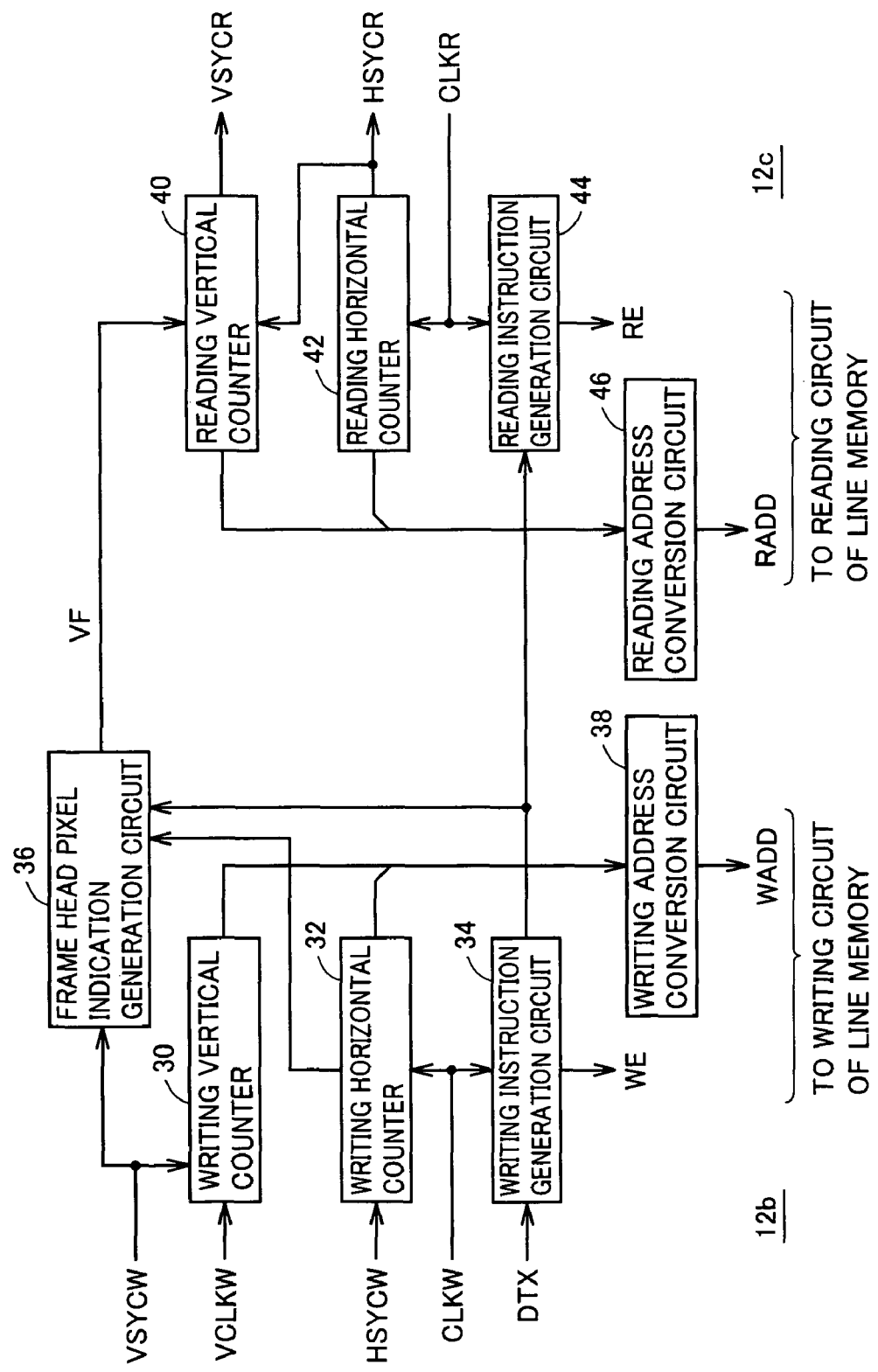
FIG. 2 is a diagram schematically showing configurations of a writing control circuit and a reading control circuit shown in FIG. 1.

FIG. 2 is a diagram schematically showing an example of configurations of writing control circuit 12b and reading control circuit 12c shown in FIG. 1. In FIG. 2, writing control circuit 12b includes a writing vertical counter 30 for generating an address that indicates a vertical position of pixel on a display screen (frame), a writing horizontal counter 32 for generating an address that indicates a horizontal position of pixel on the frame, and a writing instruction generation circuit 34 for generating a writing instruction WE to image data storage 12a (line memories).

Writing vertical counter 30 has a count value updated in accordance with a writing vertical clock signal VCLKW from image size conversion circuit 10 shown in FIG. 1, and reset to an initial value in accordance with a writing vertical synchronization signal VSYCW. The count value of writing vertical counter 30 is used as an address that designates line memories LM1 to LMn placed in image data storage 12a. Writing horizontal counter 32 updates its count value in accordance with a writing clock signal CLKW, and resets its count value to an initial value in accordance with a writing horizontal synchronization signal HSYCW from image size conversion circuit 10. Writing clock signal CLKW is generated based on clock signal CLK1 shown in FIG. 1, and defines writing speed of pixels on one line. Count values of writing vertical counter 30 and writing horizontal counter 32 are applied in parallel as a writing address signal WADD to writing circuits of the line memories of image data storage 12a.

Writing instruction generation circuit 34 is activated in accordance with a data transfer instruction DTX from image size conversion circuit 10, and generates writing instruction WE in synchronization with writing clock signal CLKW.

Writing control circuit 12b further includes a frame head pixel indication generating circuit 36 for generating a signal VF instructing the writing of the head pixel of the frame. Frame head pixel indication generating circuit 36 activates the frame head pixel writing instruction signal VF in accordance with writing vertical synchronization signal VSYCW, count value of writing horizontal counter 32, and an output signal of writing instruction generation circuit 34.

Count values of writing vertical counter 30 and writing horizontal counter 32 are applied to the line memories of the image data storage via a writing address conversion circuit 38. Writing address conversion circuit 38 converts the output count value of writing vertical counter 30 into a line memory selection signal and output the same. This line memory selection signal has a function similar to that of a chip selection signal in memory art, and one of line memories LM1 to LMn is designated, and pixel data are sequentially written in accordance with count value generated by writing horizontal counter 32. The number of line memories LM1 to LMn is 10 or so, and the number thereof is smaller than the line number in one frame. Therefore, a line memory is selected cyclically by writing address conversion circuit 38 according to the count value of writing vertical counter 30.

When the number of line memories LM1 to LMn is n-th power of 2, a line memory can be designated sequentially and cyclically by using lower n bits of writing vertical counter 30 as a line memory address.

Reading control circuit 12c includes a reading vertical counter 40 for generating an address indicating a vertical position of a pixel read target on the frame, a reading horizontal counter 42 for generating an address indicating a horizontal position on screen of the readout pixel, and a reading instruction generation circuit 44 for generating a reading instruction signal RE.

Reading vertical counter 40 resets its count value to an initial value in accordance with frame head pixel writing instruction signal VF from frame head pixel indication generating circuit 36 and a reading horizontal synchronization signal HSYCR from reading horizontal counter 42. Reading vertical counter 40 also updates its count value by one in accordance with reading horizontal synchronization signal HSYCR from reading horizontal counter 42, and asserts reading vertical synchronization signal VSYNC when the count value reaches a predetermined value. Count value of reading vertical counter 40 designates a line memory to be read, and a reading vertical synchronization signal VSYNCR from reading vertical counter 40 defines one frame time period of the readout image.

Reading horizontal counter 42 performs count-up operation in accordance with a reading clock signal RCLK, and asserts the reading horizontal synchronization signal HSYCR when the count value reaches a predetermined value and data of pixels on one line are read out. Therefore, the reading horizontal synchronization signal HSYCR defines a time period of one line of readout pixels.

Reading instruction generation circuit 44 is activated in accordance with writing operation start signal from writing instruction generation circuit 34 included in writing control circuit 12b, and generates reading instruction signal RE at a predetermined timing onto reading circuits of the line memories of the image data storage. Count values of reading vertical counter 44 and reading horizontal counter 42 are applied to the line memories as a reading address signal RADD. The line memory to be read out is designated by the count value of reading vertical counter. In synchronization with reading of data, reading vertical synchronization signal VSYCR and reading horizontal synchronization signal HSYCR are, respectively, generated from reading vertical counter 40 and reading horizontal counter 42 onto display device (3).

These reading vertical counter 40 and reading horizontal counter 42 are activated in accordance with a signal indicating a reading operation start time from reading instruction generation circuit 44, and performs counting operation. In this reading of pixel data, reading instruction generation circuit 44 starts reading of pixel data with a delay of a predetermined line time period from starting of writing of pixel data by writing instruction generation circuit 34 so as not to cause overflow and underflow of data stored in the image data storage 12.

Figure 3:
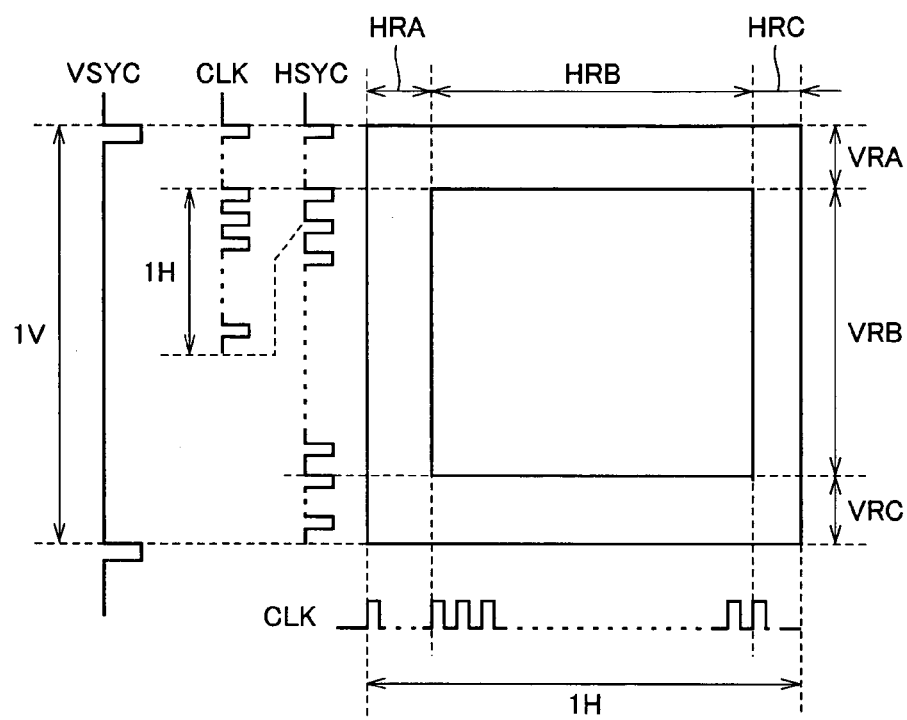
FIG. 3 is a diagram schematically showing a frame configuration, and relationship between synchronization signals and clock signals in the first embodiment of the present invention.

FIG. 3 is a diagram schematically showing a frame structure of image data in image size conversion circuit 10 and in signal-for-display generation circuit 12. As shown in FIG. 3, a frame image has a front horizontal invalid region HRA, a valid region HRB and an end horizontal invalid region HRC in the horizontal direction. Likewise, it has a front vertical invalid region VRA, a vertical valid region VRB and an end vertical invalid region VRC in the vertical direction. Invalid regions HRA and HRC represent pixels that are not displayed on the screen due to horizontal blanking period. In the horizontal direction, the horizontal counter executes counting in accordance with clock signal CLK (CLKW, RCLKR), and sequentially designates pixels of each line (horizontal scanning line). In this scanning period in horizontal direction, pixels of one line in regions HRA, HRB and HRC are scanned, and this period is one horizontal scanning period (1H).

In the vertical direction, a horizontal synchronization signal HSYC is applied for switching of these lines. By horizontal synchronization signals HSYC (HSYCW, HSYCR), one horizontal scanning period, 1H, is defined, and during this time period, pixels of a corresponding line are sequentially designated in accordance with clock signal CLK. Invalid regions VRA and VRC include pixels of vertical blanking period. Data of pixels in these invalid regions are not displayed.

Vertical synchronization signal VSYC defines one frame, and is asserted when horizontal synchronization signal HSYC designates the number of lines of frames. Scanning period for one frame is one vertical scanning period (1V). Number of pixels in horizontal and vertical directions in one frame are defined according to resolution of the frame.

In the following description, image data storage 12a stores not only data of pixels in valid regions HRB and VRB in one frame, but also data of pixels in the invalid regions in the one frame. This is for the following reason. From camera module 1, data of pixels corresponding to vertical and horizontal blanking periods are output. Also in image size conversion circuit 10, successive image data outputted from camera module 1 are subjected to predetermined processing such as size conversion and balance adjustment. These pixels in the invalid regions are also subjected to image processing similarly and stored in the line memories of image data storage 12a. By successively performing image processing according to horizontal and vertical synchronization signals from the camera module, processing such as address conversion in storing pixel data into the line memories is simplified.

Figure 4:
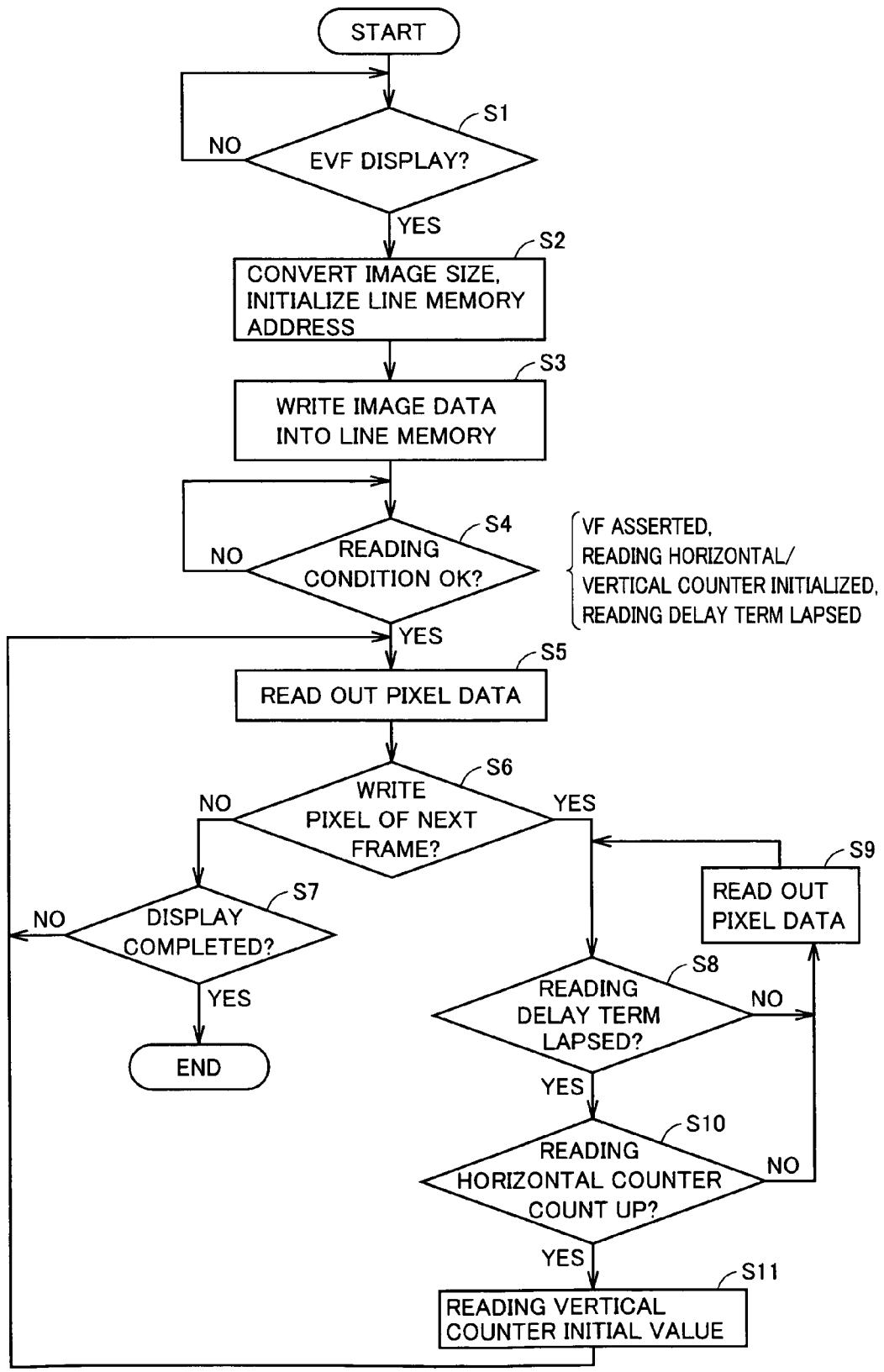
FIG. 4 is a flowchart showing operation of an image signal processor according to the first embodiment of the present invention.

FIG. 4 is a flowchart representing image data transfer operations to the display device in image processing controlling device 2 in the first embodiment of the present invention. In the following, referring to FIG. 4, operation of the image processing controlling device shown in FIG. 1 and FIG. 2, in particular, signal-for-display generation circuit 12 will be explained. In the following description, the description will be made on the case where camera module 1 is a digital still camera, as an example. Also in the case where camera module 1 is a digital video camera, similar processing is executed.

First, whether image display is to be made on display device 3 is determined (Step S1). In the case where display device 3 is a view finder (EVF), in main controller 18, whether a EVF display instruction is applied is determined in accordance with the instruction on whether camera module 1 enters an imaging mode. In the case where both an optical view finder (OVF) and an EVF are used as view finders for camera, main controller 18 determines whether display on display device 3 is designated in accordance with the EVF display instruction from an operational switch.

When the EVF display instruction is applied, image size conversion circuit 10 is activated by main controller 18, and frame image data supplied from camera module 1 are converted to have the size and image quality that are suited for display on display device 3, and the converted image data are given to signal-for-display generation circuit 12. At this time, in signal-for-display generation circuit 12, address initialization is executed for each of line memories LM1 to LMn by writing control circuit 12b and reading control circuit 12c (Step S2).

Then, image data after conversion from image size conversion circuit 10 are sequentially stored in line memories LM1 to LMn of image data storage 12a under the control of writing control circuit 12b (Step S3). In this case, in writing control circuit 12b, writing instruction generation circuit 34 generates writing instruction WE in accordance with data transfer instruction DTX from image size conversion circuit 10, and writing vertical counter 30 and writing horizontal counter 32 update the respective count values in accordance with clock signals CLKW and VCLKW, respectively, to generate writing address WADD, as shown in FIG. 2. In image data storage 12a, pixel data are sequentially written into each line memory for each line of the frame, using address from writing vertical counter 30 as an address for designating a line memory.

In reading control circuit 12c, reading is started after pixel data of a few lines are written so that overtaking between writing and reading in image data storage 12a will not occur (Step S4). Specifically, when frame head pixel writing instruction signal VF is asserted, and writing of head pixel is designated, and count values of reading vertical counter 40 and reading horizontal counter 42 are initiated, reading instruction generation circuit 44 shown in FIG. 2 determines whether a time period of a few lines has lapsed based on a control signal from writing instruction generation circuit 34. When a predetermined period elapses and the reading condition is satisfied, reading instruction generation circuit 44 asserts reading instruction RE, and reading vertical counter 40 and reading horizontal counter 42 each start the counting operation. In this case, in reading address RADD, the count value of reading vertical counter 40 is used as an address for designating a line memory to be read (Step S5).

Subsequently to reading of pixel data from the head or starting position, whether writing of the next frame pixel is to be made is determined (Step S6). When writing of the next frame pixel need not be made, whether a display completion instruction is applied is determined subsequently (Step S7). When the display completion instruction is not supplied, entire pixel data of the current frame are not displayed yet. Therefore, reading of pixel data from Step S5, namely, reading of pixel data of the current frame is continued.

Whether writing of pixels of the next frame is performed is determined based on whether frame head pixel writing instruction signal VF from frame head pixel indication generating circuit 36 has been asserted. Therefore, in reading control circuit 12c, reading vertical counter 40 and reading horizontal counter 42 each perform counting up operation and update the address until pixel of the next frame is applied. According to this address, pixel data are sequentially read out from the line memory. In this reading operation, reading horizontal counter 42 generates the reading address of pixel data on the line according to reading clock signal CLKR in reading control circuit 12c, and resets the count value to the initial value whenever one horizontal period completes. At the time of resetting the count value to initial value, the reading horizontal counter generates the reading horizontal synchronization signal HSYCR; and the count value of reading vertical counter 40 is updated and next line is designated. Display of pixels of one frame are successively executed.

In Step S6, when frame head pixel writing instruction signal VF is asserted, reading instruction generation circuit 44 determines whether the scanning period for a predetermined number of lines has elapsed (Step S8). Image data are successively read until reading of pixel data of the lines in the predetermined reading delay period (reading the lines corresponding to delay of reading to writing) completes (Step S9). In reading of pixel data in Step S9, pixel data of invalid region VRC shown in FIG. 3 are read out. After elapse of reading delay period of time, subsequently determination is made on whether reading horizontal counter 42 determines performs counting up (Step S10). When reading horizontal synchronization signal HSYCR from reading horizontal counter 42 is not asserted, pixel data is read out in accordance with the count value of reading horizontal counter 42 (Step S10, S9).

When a predetermined delay period of time elapsed and scanning of one line completes after writing of the head pixel of the next frame, the count value of reading vertical counter S11 is initialized, and subsequently reading of pixel data from the head pixel position is executed. Thereafter, reading operation starting at Step S5 is executed.

Therefore, when writing speed (rate) and reading speed (rate) of line memories LM1 to LMn of image data storage 12a are differ from each other, in one frame, timing adjustment of vertical synchronization signal is executed on one line basis, and frame synchronization is established. Specifically, when writing speed is faster than reading speed, one horizontal line is cancelled each a few frames, to shorten the reading vertical synchronization period. Contrarily, when writing speed is slower than reading speed, one horizontal line is inserted for each a few frames, to increase reading vertical synchronization period. The number of frames for which insertion/cancellation of the horizontal line is made is determined in accordance with difference between the writing speed and the reading speed.

Through the aforementioned operations, even in the case where the writing clock signal and reading clock signal for the line memories of image data storage 12a are generated asynchronously in signal-for-display generation circuit 12, it is possible to accurately establish frame synchronization and to display image data on the display device.

FIG. 5A to FIG. 5D illustrate the frame adjusting operations when writing speed of the line memories is faster than the reading speed thereof, that is, when the writing speed from pixel size conversion circuit 10 is faster than a pixel data transfer speed to display device 3. In FIG. 5A, the case where one frame includes lines l1 to lc is shown as one example. Reading operation starts with a delay of k lines to writing. For convenience of description, it is assumed that the number of lines in the frame is the same between writing and reading.

As shown in FIG. 5A, pixel data RP is read out from head (starting) line l1 in synchronization with writing of writing a pixel data WP into a line la+1. Distance from line l1 to line la is k lines.

In the case where writing speed is fast, reading is performed not in line lb, but in an upper line lb−1 when write pixel data RP is written into head line l1 after reading of a few frames as shown in FIG. 5B. When write pixel WP is the head pixel of the frame, frame head pixel writing instruction signal (VF) is asserted.

As shown in FIG. 5C, in the state of after lapse of a period k·H (H: 1 line period (horizontal scanning cycle time)) from writing of head pixel of the frame, reading of pixel data is executed for line lc−1 when writing pixel WP is written into line la+1. After reading out pixel data RP of this line lc−1, the reading vertical counter is reset. Therefore, as shown in FIG. 5D, in reading of next line, pixel data RP is read from line l1.

At this time, in line la+1, write pixel data WP is written, and the frame is synchronized on a line step (one horizontal scanning cycle period H). In other words, in this case, last line lc is cancelled, and pixel data of line lc is not transferred to the display device. In this case, as shown in FIG. 3, last line lc is of pixels of an invalid pixel region in vertical blanking period, so that no problem arises even if it is not transferred. By cancellation of this one line lc, the vertical blanking period for the reading frame is shortened by a time period of one line, and the difference between the writing and reading speeds is absorbed.

Figure 6A:
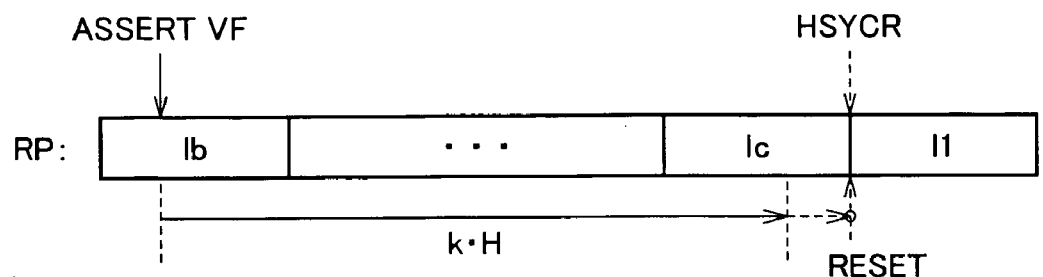
FIG. 6A and FIG. 6B are diagrams schematically representing reset operation of reading pixel line when a vertical synchronization is established.
Figure 6B:
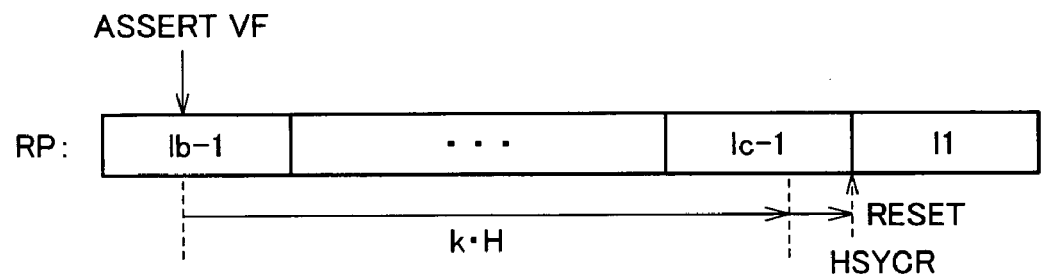

FIG. 6A and FIG. 6B are diagrams schematically representing an operation sequence from writing of the head pixel of the frame of the line memory to resetting of the reading address. FIG. 6A shows a reset sequence of the reading address when difference between a writing line and a reading line is k lines, and FIG. 6B shows a reset sequence of the reading address when difference between the writing line and the reading line is k+1 lines.

In FIG. 6A, when pixel of line lb is read out as reading pixel RP, frame head pixel writing instruction signal VF is asserted. In this case, all pixel data of k lines from line lc to line lb are read out. That is, pixel of last line lc is read out, and after reading of all pixels in line lc completes, the vertical address is reset in accordance with reading horizontal synchronization signal HSYCR, and reading of pixel data from head line l1 is started. Therefore, in this case, pixels from lines l1 to lc are read out in accordance with the reading instruction, and the vertical scanning period is the same between writing and reading.

In FIG. 6B, when the writing speed is faster than the reading speed, and frame head pixel writing instruction signal VF is asserted, pixels of line lb−1 which is upper-by-one line of line lb are read out. Pixel data of k lines from line lb−1 to line lc−1 are sequentially read out. After reading out all pixel data of line lc−1, the count value of the vertical counter is reset in synchronization with horizontal synchronization signal HSYCR. Therefore, after reading of pixel data of line lc−1, line lc is jumped and pixel data of head line l1 is read out and transferred to the display device. In this case, one horizontal scanning line (line) is cancelled in vertical blanking period, to shorten the vertical scanning period by 1H.

FIG. 7A to FIG. 7D are diagrams schematically showing a sequence of establishing frame synchronization when writing speed of the line memories is slower than reading speed thereof. In FIG. 7A, likewise the previous FIG. 5A. reading of pixel data is started with a delay of k lines to writing. That is, in synchronization with writing of writing pixel data WP to line la+1, pixel data RP of head line l1 is read out. After a lapse of writing and reading of image data of a few frames, write pixel data WP is written into head line l1. Reading speed is faster than writing speed. Therefore, at this time, on the reading side, read pixel data RP on a line lb+1 which is one line lower than line lb is read out, as shown in FIG. 7B.

Then, after a lapse of k horizontal scanning periods (k·H), write pixel data RP is written into line la+1 as shown in FIG. 7C. On the reading side, reading of pixel data RP from a line lc+1 is performed. That is, pixel data of line lc+1 is further read out while going beyond last line lc. In this case, pixel data stored in head line l1 is read out as reading pixel data RP, or pixel data of last line lc is read out again.

Upon completion of reading of pixel data of last pixel line lc+1 (=l1 or lc), reading vertical address (V) is reset, and read pixel data RP is read out from head line l1. Pixel data of line lc+1 is read out in vertical blanking period, and is not displayed on the screen of the display device. Therefore, no particular problem arises even when pixel data of line lc or l1 is read out twice.

As a result of this operation, as shown in FIG. 7D, frame synchronization is adjusted and established as one reading horizontal line in the frame is added to elongate the vertical scanning period. In this case, frame synchronization between writing and reading is established in a time width of one line.

Figure 8A:
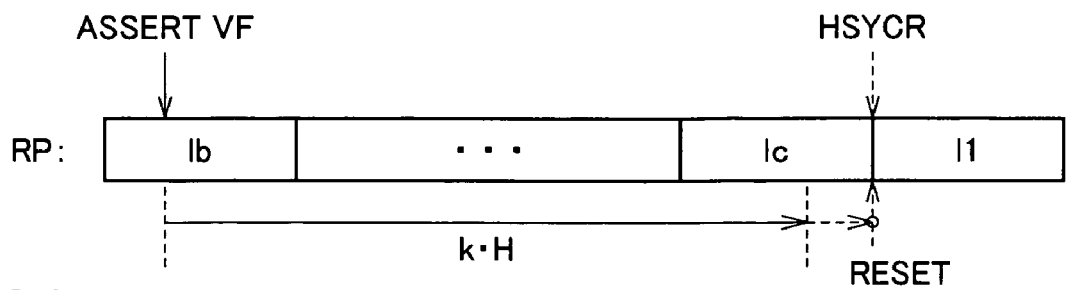
FIG. 8A and FIG. 8B are diagrams schematically representing reset operation of reading pixel line when the vertical synchronization is established.
Figure 8B:
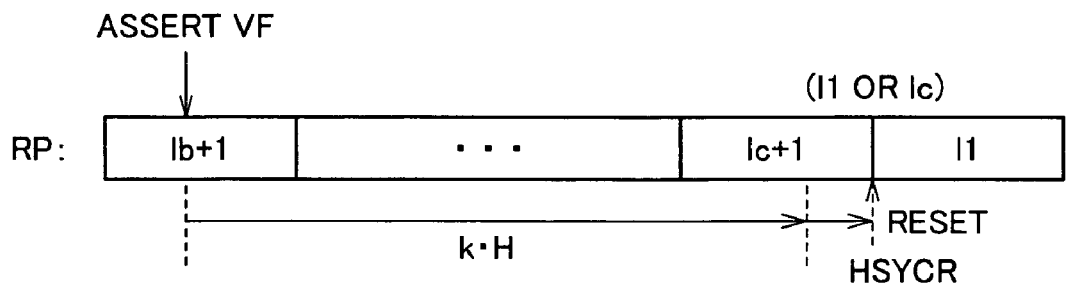

FIG. 8A and FIG. 8B are diagrams illustrating the frame synchronization establishing scanning sequence shown in FIG. 7B to FIG. 7D more specifically. FIG. 8A shows a reset sequence of the vertical address in the case when frame synchronization is established, and FIG. 8B shows a vertical address reset sequence in the case when the reading speed is faster than the writing speed. As shown in FIG. 8A, when frame synchronization is under establishment, frame head pixel writing instruction signal VF is asserted when read pixel data RP is pixel data on line lb, as in reading address updating sequence shown in FIG. 6A. Thereafter, pixel data of k lines from line lb to line lc are read out. After reading out pixel data of line lc, the reading vertical address is reset in accordance with horizontal synchronization signal HSYCR. From the next cycle, pixel data is read out from head line l1. In this case, the line number in the frame is the same between writing and reading.

When the writing speed is slower than the reading speed as shown in FIG. 8B, pixel data of line lb+1 is read out when writing frame head image instruction signal VF is asserted. Thereafter, pixel data of k lines are read out. Therefore, pixel data of line lc+1 is read out, going beyond line lc. Line lc+1 is a virtual line, and the address of reading vertical counter is returned to head line l1, and head line l1 is read out as additional line lc+1. Alternatively, when the signal VF is asserted, the count value of vertical counter is not initialized until pixel data of k lines are read out, and the count up value is outputted again and pixel data of line lc are read out.

Upon completion of reading of pixel data of line lc+1, horizontal synchronization signal HSYCR is asserted, and accordingly, the count value of the vertical counter is reset to the initial value. In the next horizontal scanning period, pixel data of head line l1 is read out.

Therefore, in this case, the vertical scanning period of reading is increased by one line as a result of addition of one horizontal scanning line (line), and this corresponds to decrease in vertical frequency.

When writing speed and reading speed are different from each other, the writing speed is not adjusted. When viewed from outside, it merely appears that pixel data are read out in accordance with the writing speed of image size conversion circuit 10, and read pixel data are transferred to display device 3, and image data is displayed on the display device. Generally, a display device such as an electronic view finder and LCD monitor is able to perform displaying as far as relationship between assertion of the synchronization signal and the valid display period is satisfied even if the blanking period is increased or decreased by a few several lines or so with respect to the blanking period (defined as an AC timing) recommended for the display device. Therefore, the phase difference between the writing clock signal and the reading clock signal will exert no influence on display of pixel data on display device 3. Using such characteristics, it is possible to absorb the difference between the writing and reading speeds (macroscopically, reading speed is adjusted to writing speed).

The line memories are provided in display image reproduction circuit 12, and no access is made to an external memory. Therefore, it is not necessary to cause DMA controller 14, external memory controller 16 and frame memory 20 shown in FIG. 1 to operate, so that power consumption can be reduced. Further, a line memory of small storage capacity is used, so that cost can be reduced. Additionally, display on a view finder can be controlled by an image display controlling device implemented by a system LSI, so that it is possible to reduce size and weight of camera controlling unit.

Figure 9:
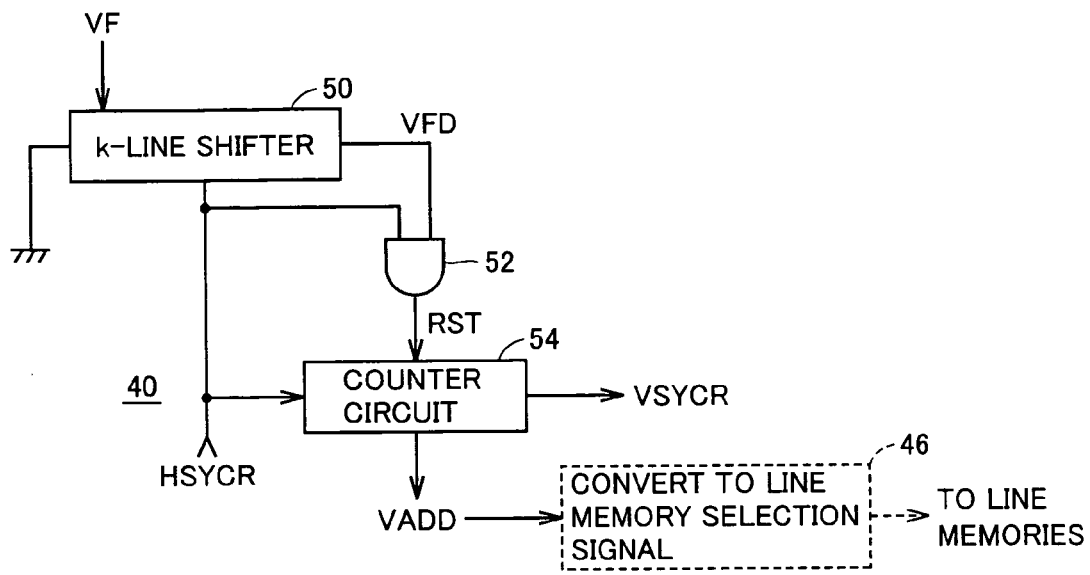
FIG. 9 is a diagram schematically showing an example of a configuration of reading vertical counter shown in FIG. 2.

FIG. 9 is a diagram schematically showing an example of a configuration of reading vertical counter 40 shown in FIG. 2. In FIG. 9, reading vertical counter 40 includes a k-line shifter 50 for performing a shifting operation in accordance with reading horizontal synchronization signal HSYCR, an AND circuit 52 for receiving reading horizontal synchronization signal HSYCR and an output signal VFD of k-line shifter 50, and a counter circuit 54 for counting reading horizontal synchronization signal HSYCR.

K-line shifter 50 includes cascaded shift circuits of k stages, and its input is connected to ground. Upon assertion of frame head pixel writing instruction signal VF, a storage value of the first-stage shift circuit of k-line shifter 50 is set. K-line shifter 50 executes a shifting operation in accordance with reading horizontal synchronization signal HSYCR. Consequently, k-line shifter 50 asserts output signal VFD after a lapse of a period of k lines since assertion of frame head pixel writing instruction signal VF.

AND circuit 52 asserts a reset signal RST when both of reading horizontal synchronization signal HSYCR and shifter output signal VFD are asserted. Counter circuit 54 counts reading horizontal synchronization signal HSYCR, and outputs reading vertical synchronization signal VSYCR when its count value returns to an initial value, and outputs the count value as a line memory selection address VADD.

Count value VADD of counter circuit 54 is converted to a line memory selection signal in reading address conversion circuit 46 and then applied to the line memories. Reading address conversion circuit 46, for example, decodes count value VADD of counter circuit 54 and generates a line memory selection signal corresponding to chip enable signal CE.

Figure 10:
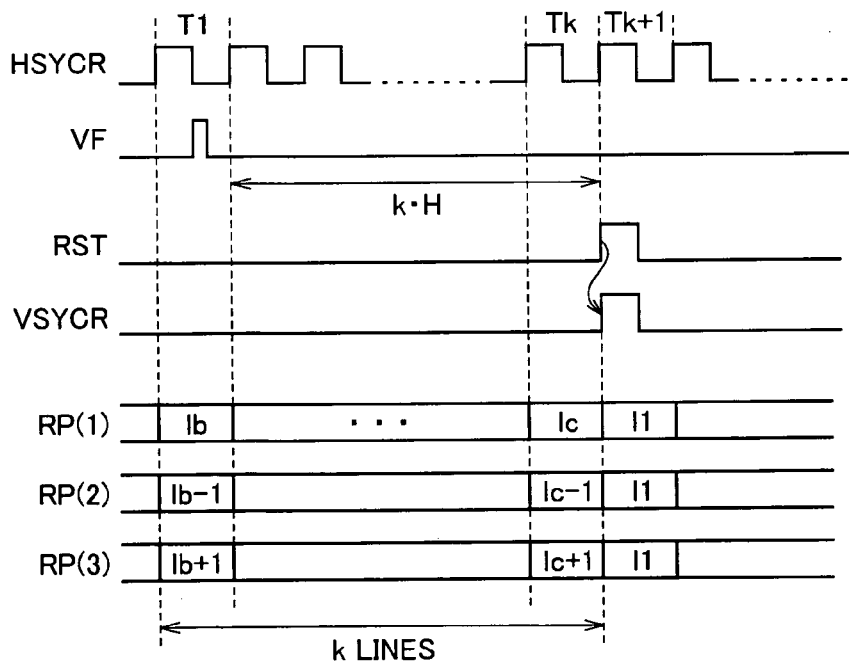
FIG. 10 is a timing chart representing operation of reading the vertical counter shown in FIG. 9.

FIG. 10 is a timing chart representing an operation of reading vertical counter 40 shown in FIG. 9. In the following, an operation of reading vertical counter 40 shown in FIG. 9 will be described with reference to FIG. 10.

In cycle T1, frame head pixel writing instruction signal VF is asserted. When difference between the writing speed and the reading speed is small (frame synchronization is established in a line basis), as shown at read pixel RP (1), pixel data of line lb are read out. When the reading speed is slower than the writing speed, as shown at read pixel RP (2), pixel data of line lb−1 which is one line before predetermined line lb are read out. When the reading speed is faster than the writing speed, as shown at read pixel RP (3), pixel data of line lb+1 which is one line after line lb are read out.

When frame head pixel writing instruction signal VF is asserted, storage value of the first-stage shift circuit in k-line shifter 50 is set. When reading horizontal synchronization signal HSYCR is applied k times, the output signal VFD from k-line shifter 50 is asserted and reset signal RST from AND circuit 52 is asserted. In response, reading vertical synchronization signal VSYCR from counter circuit 54 is asserted, and count value VADD is reset to an initial value.

Therefore, k-line shifter 50 asserts reset signal RST in accordance with reading control synchronization signal HSYCR of a cycle Tk+1 which is next to a cycle Tk, and accordingly, reading vertical synchronization signal VSYCR from counter circuit 54 is asserted.

In cycle Tk, when the deviation between reading and writing is small, as shown at read pixel RP (1), pixel data of line lc which is k lines later are read out. When the reading speed is slow, as shown at read pixel RP (2), pixel data of line lc−1 are read out. When the reading speed is fast, as shown at read pixel RP (3), pixel data of line lc+1 are read out.

Therefore, in cycle Tk+1, when the count value of counter circuit 54 is reset to the initial value, and reading vertical synchronization signal VSYCR is asserted, reading of pixel from head line l1 of the frame is started. Thus, it is possible to adjust a period of reading vertical synchronization signal in a one line unit of the scanning period depending on writing and reading states.

In the configuration of vertical synchronization counter 46 shown in FIG. 9, counter circuit 54 may be configured by a shift circuit that generates a line memory selection signal (chip selection signal) for line memories L1 to Ln. By using a ring-form shift counter register circuit, it is possible to sequentially select a line memory without address conversion. In this case, it is sufficient to assert vertical synchronization signal VSYCR when reset signal RST is asserted. Shifting operation is performed, and according to the output signal, the line memories are designated sequentially and cyclically. Even in the state that a head line memory is designated on a middle of the frame, vertical synchronization signal VSYCR is not asserted unless reset signal RST is asserted. Therefore, it is possible to accurately read out pixels of one frame.

According to the first embodiment of the present invention, line memories are provided in this signal-for-display generation circuit 12, and image data subjected to size adjustment from image size conversion circuit 10 are directly selected and transferred to the display device via the line memories, and the following effects are achieved. It is not necessary to write/read image data via external memory controller 16 and frame memory 20. Therefore, it is possible to halt operations of bus 15, DMA controller 14, external memory controller 16 and frame memory 20, and to reduce power consumption in monitoring imaging state of a photographic subject.

Also, synchronization is established in parallel with writing and reading of pixel data, by adjusting reading vertical scanning period based on the time relationship between writing of the frame head pixel and reading of the line. Therefore, it is possible to adjust the synchronization during display of image data, and establishment of synchronization can be easily controlled. Also, synchronization is established in parallel with writing and reading of pixel data of the line memories, so that it is possible to transfer pixel data to be displayed to the display device quickly, and to execute a focus adjustment and a magnification adjustment at a faster timing. Further, even when phase difference between the writing and reading clock signals varies during an access period of the line memories, it is possible to adjust the vertical scanning period of the readout image in accordance with the phase difference, and hence to achieve accurate image display.

In the above description, image data of the invalid regions are also stored in line memories LM1 to LMn of image data storage 12*a*. In the case when pixel data of only the valid region is transferred to the display device from image data storage 12*a*, for example, such a configuration may be employed that after assertion of vertical synchronization signal VSYCR, reading operation clock signal CLKR is counted and reading of pixel data of the invalid region is inhibited. The number of pixels present after assertion of vertical synchronization signal VSYCR and before the head pixel of the valid region is read out (the number of the horizontal synchronization signal and the reading clock signal) is stored in a register circuit. In reading control circuit, reading instruction signal RE is kept in the deasserted state during this period of time, and when the head pixel of the valid region is reached, reading instruction signal RE is asserted. As a result, it is possible to read out pixel data of the valid region and transfer the same to the display device.

Also, a configuration that extracts and displays data of pixel in the valid region in accordance with the reading vertical synchronization signal and the reading horizontal synchronization signal may be used in the display device. In the case of such configuration, data that represents the number of pixels (distance) between the head pixel and the head pixel of the valid region in the reading frame is stored in a register circuit, and pixels of the valid region are extracted in the display circuit.

As described above, according to the first embodiment of the present invention, in displaying image data on the display device, line memories are provided inside the display signal generation circuit, and image data from the image size conversion circuit are stored and transferred to the display device via these line memories. Thus, it is possible to reduce power consumption without necessity of operations of memory controller, the frame memory and the like outside the image display control device (system LSI). Further, vertical synchronization of reading and writing can be adjusted merely by adjusting a time period of the reading vertical synchronization signal in a line unit in parallel with writing and reading, depending on the states of writing into and reading from the line memories. Therefore, even when the phase difference in clock signal arises between the writing clock signal and the reading clock signal, it is possible to write/read pixel data and display the pixel data on the display device easily and accurately through the use of the line memories without performing a complicated calculation and the like.

The display device may be either an electronic view finder (EVF) in a digital still camera, or a LCD monitor in a digital video camera. Also for a moving image, the horizontal synchronization signal and the vertical synchronization signal are generated, and according to these synchronization signals, pixel data is transferred. Therefore, also for moving image data, it is possible to display an image on a display device while absorbing the phase difference between writing and reading clock signals through the control similar to the control as described above.

Second Embodiment

Figure 11:
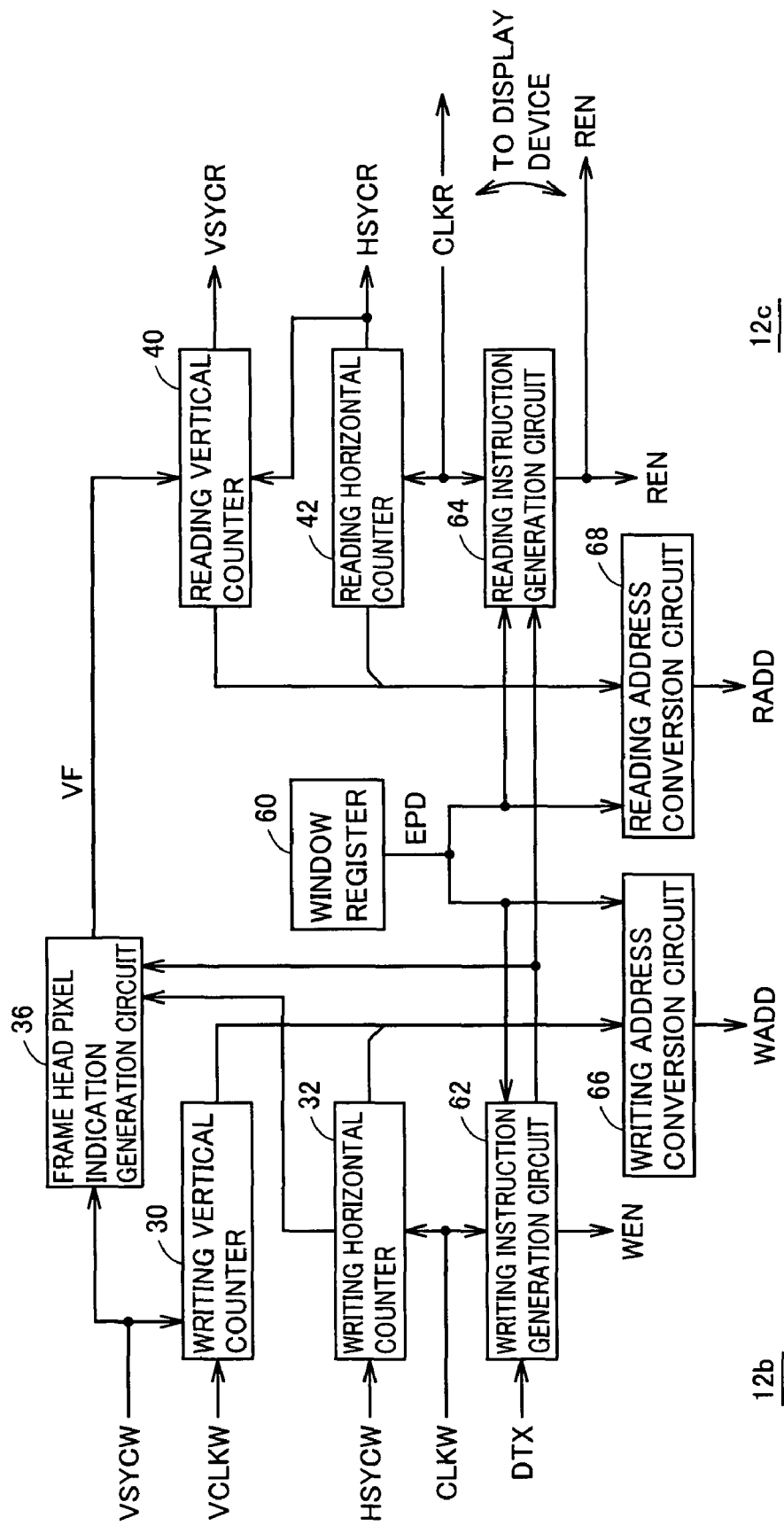
FIG. 11 is a diagram schematically showing configurations of a writing control circuit and a reading control circuit according to a second embodiment of the present invention.

FIG. 11 is a diagram schematically showing configurations of a writing control circuit 12*b* and a reading control circuit 12*c* in a signal-for-display generation circuit 12 according to the second embodiment of the present invention. Writing control circuit 12*b* and reading control circuit 12*c* shown in FIG. 11 are different in configuration from writing control circuit 12*b* and reading control circuit 12*c* shown in FIG. 2 in the following points. Specifically, in FIG. 11, a window register 60 is provided. This window register 60 stores data EPD designating a valid region of a frame. That is, window register 60 stores data EPD representing a distance from the head position of the frame and the head position of a valid pixel region (horizontal and vertical pixel numbers).

A writing instruction generation circuit 62 activates (asserts) a write activation signal WEN only in writing of pixel data of the valid region in accordance with valid region instruction data EPD from window register 60. A writing address conversion circuit 66 coverts, into an address, count values from writing vertical counter 30 and writing horizontal counter 32 in accordance with valid pixel region data EPD from window register 60, and sets the count values to initial values of the valid pixel region when the valid pixel region is reached.

A reading instruction generation circuit 64 activates a reading activation signal REN only in reading of pixel data of the valid pixel region in accordance with valid pixel region data EPD from window register 60. A reading address conversion circuit 68 converts count values of reading vertical counter 40 and reading horizontal counter 42 in accordance with valid pixel region data EPD from window register 60, to generate an address RADD representing a pixel position in the valid pixel region.

These address conversion circuits 66 and 68 perform address conversion, for example, by subtraction of count values of counters 30, 32, 40 and 42 in accordance with valid pixel region data EPD from window register 60.

Figure 12:
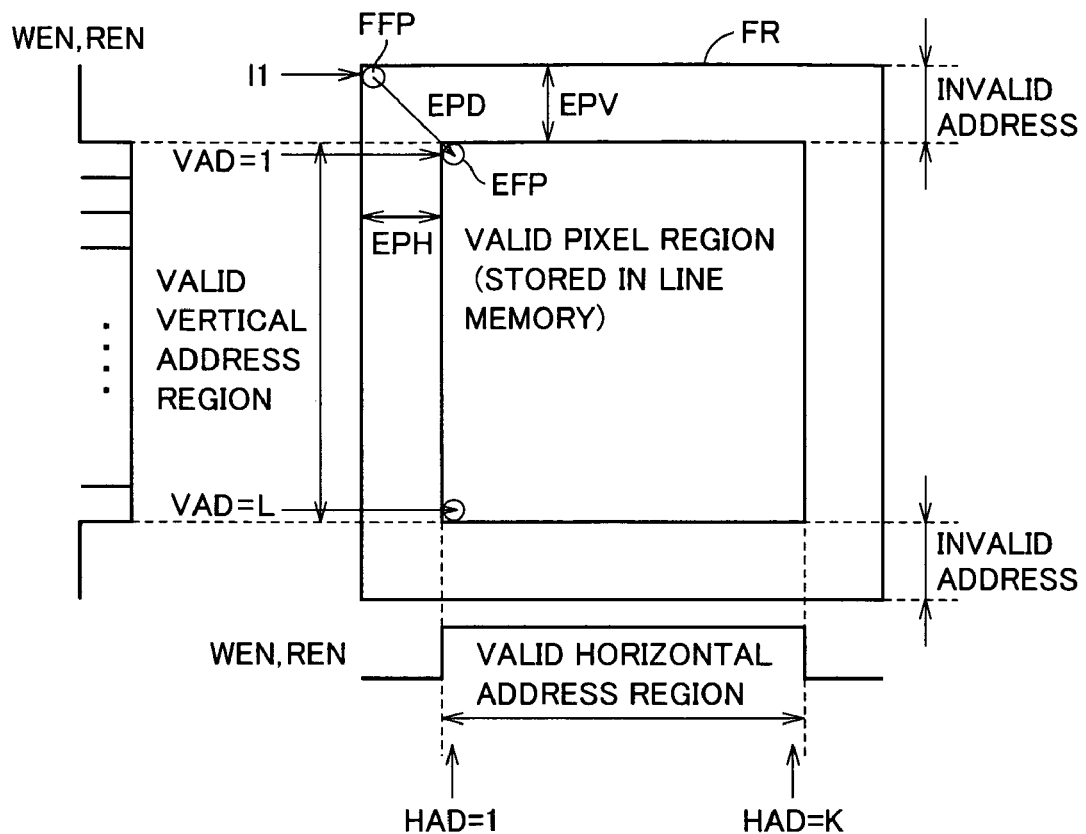
FIG. 12 is a diagram schematically showing correspondence between a pixel region and a control signal in the second embodiment of the present invention.

FIG. 12 is a diagram schematically representing operation states of the circuits shown in FIG. 11. In FIG. 12, a frame FR includes an invalid address region and a valid address region. As to the valid vertical address region, a head address VAD is 1, and a last vertical address VAD is L. Valid horizontal address region is a region in which a head value of a horizontal address HAD is 1, and the last address is K.

Outside region of valid address region, or a pixel region corresponding to the blanking periods is processed as an invalid address region. In valid horizontal address region, reading activation signal REN and writing activation signal WEN are activated, and writing and reading of pixel data of the line memories are executed. Also in valid vertical addresses in the vertical direction, writing activation signal WEN and reading activation signal REN are kept in an activated state for the valid horizontal address region for each line.

Writing address conversion circuit 66 and reading address conversion circuit 68 execute an address conversion in accordance with data EPD stored in window register 60. Distance from head pixel FFP of frame FR to a head pixel EFP of the valid pixel region is represented by data EPD. This data EPD includes both horizontal distance and vertical distance (pixel number). Distance in the vertical direction between frame head pixel FFP and head pixel EFP of the valid pixel region is EPV (the number of lines) and distance in the horizontal direction (the number of pixels in horizontal direction) is EPH.

Address conversion circuits 66 and 68 execute the address conversion in the following manner. Value of vertical direction EPV is subtracted from the count value of vertical counter 30 or 40, and when the differential value is 0 or less, the count is regarded as an invalid address, and the output address is set to a value that does not designate any line memory or a value to designate a head line memory (in this region, writing activation signal WEN and reading activation signal REN are in a negate state). When the count value of vertical counter 30 or 40 reaches vertical distance EPV, the head line memory is designated by setting vertical address VAD to 1.

As to the horizontal address, horizontal distance data EPH is subtracted from the count value of horizontal counter 32 or 42. When the count value of horizontal counter 32 or 42 is EPH, horizontal address HAD is set to 1. In the valid pixel region (valid vertical and horizontal address region), writing activation signal WEN and reading activation signal REN are in an asserted state.

The numbers of pixels (valid pixel numbers) in the vertical direction and horizontal direction in the valid pixel region are predetermined. Therefore, address conversion circuits 66 and 68 stop generating an address at last address HAD=K or when vertical address reaches the last address VAD=L, and subsequently generate invalid addresses. In this state, writing activation signal WEN and reading activation signal REN are in the negate state, and writing and reading of pixel data in the invalid region are stopped even when image data are transferred from image size conversion circuit 10.

Since the line memories are each a FIFO (First-in, First-out) memory, the address for the image data storage is sequentially incremented in vertical direction and in horizontal direction. When the horizontal address reaches a maximum value K through sequential counting operation, the updating operation is stopped, and subsequently invalid addresses are generated. According to vertical address VAD, the line memories are sequentially designated cyclically until vertical address VAD reaches L. Upon completion of scanning of the last valid vertical address in the valid pixel region, updating of the vertical address is stopped, and subsequently invalid vertical addresses are generated and designation of a line memory is not executed.

Writing activation signal WEN and reading activation signal REN are asserted only in writing and reading of pixel data in the valid pixel region. Therefore, in address conversion circuits 66 and 68, the address may be initialized to the head valid address after generation of the last valid address.

Further, in conversion of vertical address that designates a line memory, a configuration that sequentially shifts the line memory selection signal in asserted state according to a transition detection signal (ATD: address transition detection) of vertical address VAD may be used. In the case of this shift configuration, it is possible to sequentially designate a line memory without performing a complicated process such as a modulo operation on a number L of lines in the valid pixel region and a number n of line memories. When last valid vertical address VAD=L is reached, writing activation signal WEN and reading activation signal REN are negated, and writing and reading of pixel data to/from the line memory are stopped.

Also in this case, the counting operation in reading vertical counter 40 is performed, similarly to that described in the first embodiment, in accordance with frame head pixel writing instruction signal VF and reading horizontal synchronization signal HSYCR from reading horizontal clock counter 42. Therefore, vertical blanking period is adjusted in one line unit, similarly to the first embodiment.

In the case of the second embodiment, only pixel data in the valid pixel region is transferred to the display device via the line memories. Therefore, only valid pixels can be captured into and displayed on the display device by supplying reading activation signal REN to the display devices, and using this reading activation signal REN as a writing instruction signal in the display device. In this case, reading clock signal CLKR is used as pixel data transfer clock signal. In the display device, switching of the frame and the line is performed in accordance with reading vertical synchronization signal VSYCR and reading horizontal synchronization signal HSYCR, and pixel data is captured and displayed in accordance with reading activation signal REN and reading clock signal CLKR.

As described above, according to the second embodiment of the present invention, only valid pixels are stored in the line memories. Therefore, the following effect is achieved in addition to the effects of the first embodiment. It is possible to reduce an address region for storing the invalid region of the frame in the line memories of the image data storage, and to reduce the storage capacity of the line memories.

The present invention realizes an image display unit integrated with a camera of low power consumption, when applied to an apparatus having a view finder function or an LCD monitor function for monitoring an imaging state of a target subject at the time of imaging, such as a digital still camera and a digital video camera. Further, by applying the present invention to a view finder or an LCD monitor image display system assembled on a camera main body, or to a system LSI having a view finder/LCD monitor image display function, it is possible to implement a digital still/video camera of low power consumption.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image display controlling device comprising:
    an image storing unit having a plurality of line memories each for storing pixel data of one line on a frame;
    a data writing unit for receiving input image data received from am image sensor and writing the received image data into said image storing unit at a writing speed;
    a data reading unit for reading out stored pixel data from said image storing unit and transferring the read out pixel data to an external display unit at a reading speed;
    a vertical counter for generating a line memory selection signal for designating a reading position in a selected line memory in accordance with a count value thereof, and
    a circuit for resetting a count of said vertical counter to an initial value in accordance with a head pixel indication from said data writing unit and an indication of completion of reading of pixel of a predetermined number of lines after said head pixel writing instruction is applied, wherein
    said data reading unit determines whether reading or skipping more pixels of an invalid pixel region of said image sensor by resetting or incrementing said count of said vertical counter in accordance with whether said writing speed of said imager sensor is slower or faster than said reading speed for said external display unit.

2. The image display controlling device according to claim 1, wherein said data reading unit cancels one line which is of said invalid pixel region of said image sensor when said writing speed is faster than said reading speed and inserts one line which is of said invalid pixel region of said image sensor when said writing speed is slower than said reading speed.

3. The image display controlling device according to claim 1, further comprising an image size conversion circuit for adjusting a size of image data from a solid-state image sensing device and generating said input image data, wherein said external display unit is one of a view finder and a liquid crystal display monitor.

* * * * *